(12) United States Patent
Aramoto

(10) Patent No.: US 9,131,352 B2
(45) Date of Patent: Sep. 8, 2015

(54) MOBILE COMMUNICATION SYSTEM, MOBILE STATION APPARATUS, HOME BASE STATION APPARATUS, AND COMMUNICATION METHOD

(75) Inventor: Masafumi Aramoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 40 days.

(21) Appl. No.: 13/818,558

(22) PCT Filed: Aug. 23, 2011

(86) PCT No.: PCT/JP2011/068960
§ 371 (c)(1),
(2), (4) Date: Feb. 22, 2013

(87) PCT Pub. No.: WO2012/026459
PCT Pub. Date: Mar. 1, 2012

(65) Prior Publication Data
US 2013/0155937 A1    Jun. 20, 2013

(30) Foreign Application Priority Data

Aug. 23, 2010   (JP) ................................. 2010-186582

(51) Int. Cl.
| | |
|---|---|
| H04H 20/71 | (2008.01) |
| H04W 4/00 | (2009.01) |
| H04W 4/08 | (2009.01) |
| H04L 12/28 | (2006.01) |
| H04W 76/00 | (2009.01) |
| H04W 8/08 | (2009.01) |
| H04W 8/18 | (2009.01) |

(52) U.S. Cl.
CPC .............. *H04W 4/08* (2013.01); *H04L 12/2838* (2013.01); *H04W 8/082* (2013.01); *H04W 76/002* (2013.01); *H04W 8/186* (2013.01)

(58) Field of Classification Search
USPC ........................................ 370/312, 328, 329
See application file for complete search history.

(56) References Cited

U.S. PATENT DOCUMENTS

| | | | |
|---|---|---|---|
| 2006/0109812 A1* | 5/2006 | Kim et al. ..................... | 370/329 |
| 2010/0220642 A1* | 9/2010 | Abraham et al. ............. | 370/312 |
| 2012/0224536 A1* | 9/2012 | Hahn et al. .................... | 370/328 |

OTHER PUBLICATIONS

3GPP, "Technical Specification Group Services and System Aspects; Local IP Access and Selected IP Traffic Offload (Release 10)", 3GPP 23.829 V1.1.0, May 2010, pp. 1-44.

* cited by examiner

*Primary Examiner* — Kiet G Tang
(74) *Attorney, Agent, or Firm* — Birch, Stewart, Kolasch & Birch, LLP

(57) ABSTRACT

A mobile station apparatus has established a first bearer that communicates with a home network and a second bearer that communicates with a core network. In the transmission of a multicast join request, the mobile station apparatus transmits the multicast join request by selecting the first bearer if the multicast join request is addressed to the home network, or by selecting the second bearer if the multicast join request is addressed to the core network. In this way, a mobile communication system is provided where the mobile station apparatus connected to a home base station apparatus determines whether a multicast group is based on a Local IP Access and then transmits the multicast join request, and the home base station apparatus appropriately establishes a multicast session to the home network or the core network in response to a determination of the mobile station apparatus.

8 Claims, 16 Drawing Sheets

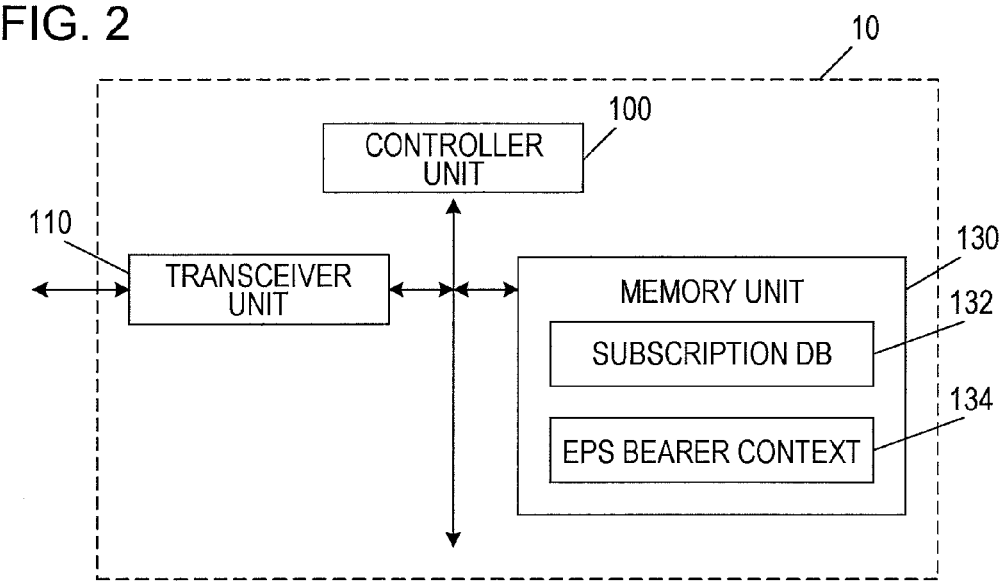

(A)

| UE IDENTIFIER | BEARER ID | UL TFT | LIPA SETTING |
|---|---|---|---|
| UE 1 | BEARER 1 | ALL | OFF |

(B)

| UE IDENTIFIER | BEARER ID | UL TFT | LIPA SETTING |
|---|---|---|---|
| UE 1 | BEARER 2 | DESTINATION: 2001:2:3:4::/64 | ON |
| | BEARER 1 | ALL | OFF |

| MULTICAST ADDRESS | GROUP JOIN UE | BEARER ID |
|---|---|---|
| FF02::C | UE 1 | BEARER 2 |

(A)
| UE IDENTIFIER | BEARER ID | UL TFT | LIPA SETTING |
|---|---|---|---|
| UE 1 | BEARER 1 | ALL | OFF |

(B)
| UE IDENTIFIER | BEARER ID | UL TFT | LIPA SETTING |
|---|---|---|---|
| UE 1 | BEARER 2 | DESTINATION: 2001:2:3:4::/64 | ON |
| | BEARER 1 | ALL | OFF |

(C)
| UE IDENTIFIER | BEARER ID | UL TFT | LIPA SETTING |
|---|---|---|---|
| UE 1 | BEARER 2 | DESTINATION: 2001:2:3:4::/64 | ON |
| | | DESTINATION: FF02::C | |
| | BEARER 1 | ALL | OFF |

FIG. 11

| MULTICAST ADDRESS |
|---|
| FF02::C |
| FF02::FB |

| UE IDENTIFIER | BEARER ID | UL TFT | LIPA SETTING |
|---|---|---|---|
| UE 1 | BEARER 1 | ALL | OFF |

(B)

| UE IDENTIFIER | BEARER ID | UL TFT | LIPA SETTING |
|---|---|---|---|
| UE 1 | BEARER 2 | DESTINATION: 2001:2:3:4::/64 | ON |
| | BEARER 1 | ALL | OFF |

(C)

| UE IDENTIFIER | BEARER ID | UL TFT | LIPA SETTING |
|---|---|---|---|
| UE 1 | BEARER 2 | DESTINATION: 2001:2:3:4::/64 | ON |
| | | DESTINATION: FF02::C | |
| | BEARER 1 | ALL | OFF |

| MULTICAST ADDRESS |
|---|
| FF02::C |
| FF02::FB |

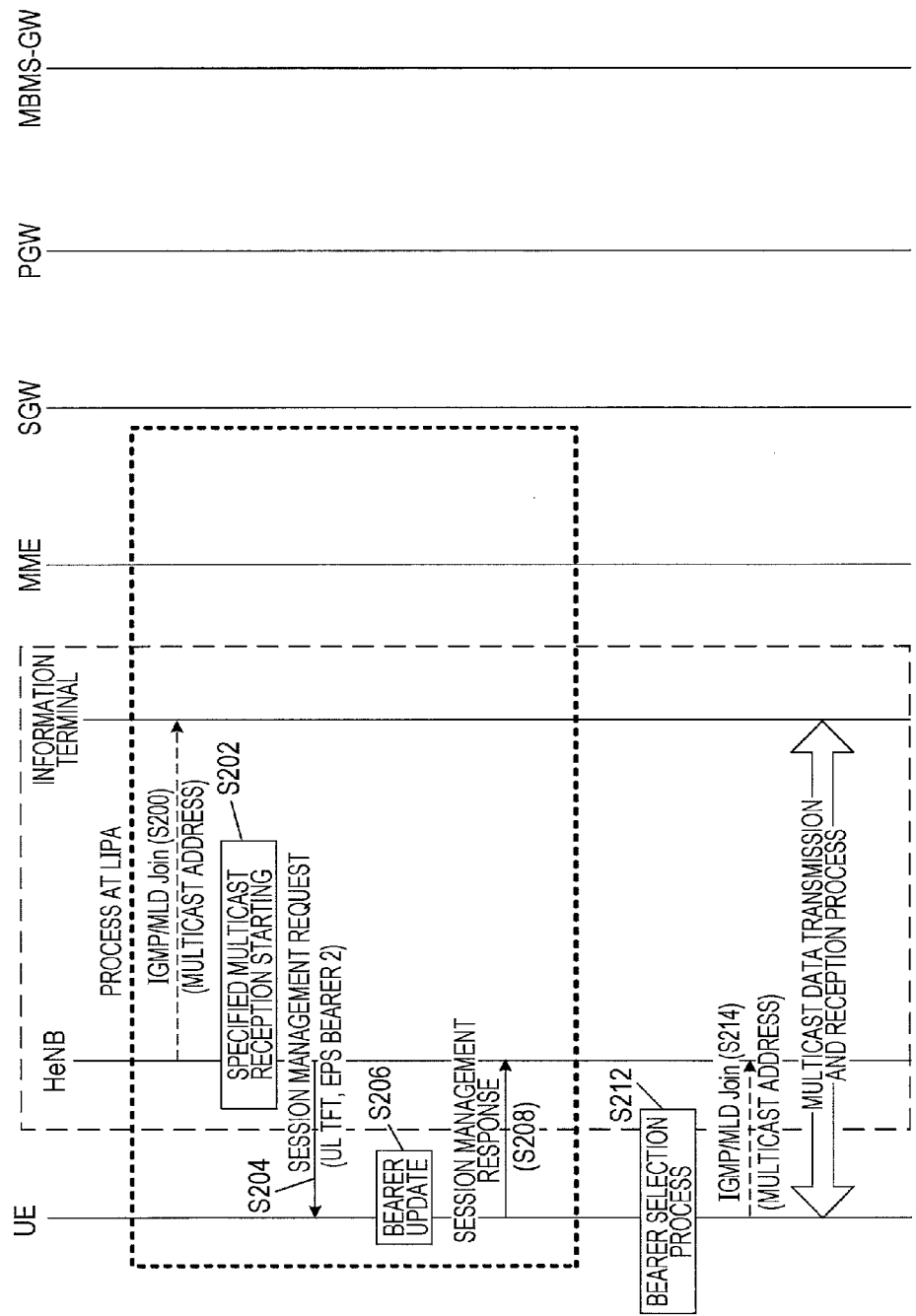

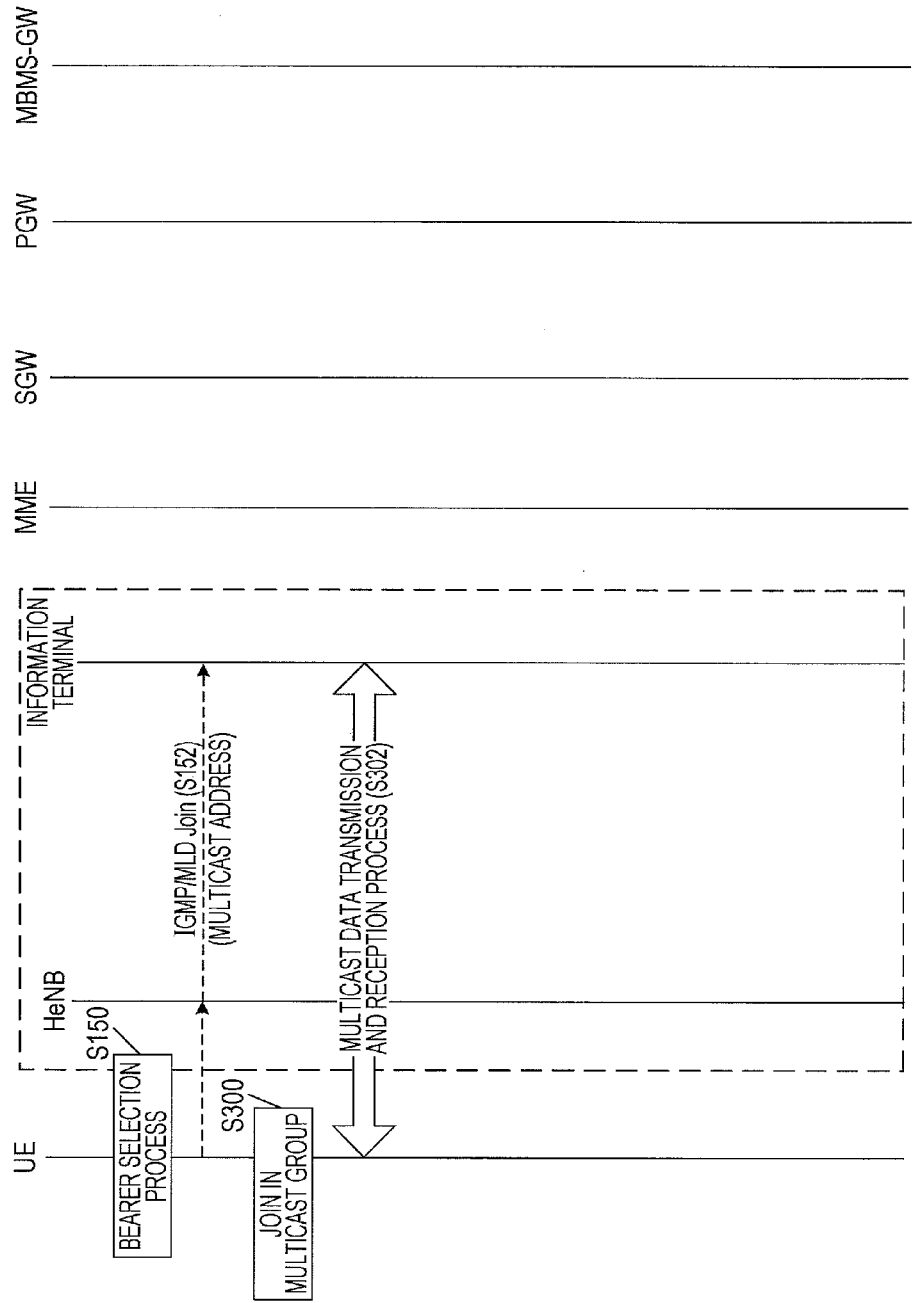

MOBILE COMMUNICATION SYSTEM, MOBILE STATION APPARATUS, HOME BASE STATION APPARATUS, AND COMMUNICATION METHOD

TECHNICAL FIELD

The present invention relates to a mobile communication system or the like, including a home network and a core network connected to each other via an external network, the home network including a home base station apparatus having a mobile station apparatus connected thereto, and the core network including a position management apparatus and an access control apparatus connected thereto.

BACKGROUND ART

In the 3GPP (Third Generation Partnership Project), standardization organizations of a mobile communication system are formulating specifications of EPS (Evolved Packet System) described in NPL 1 as a next-generation mobile communication system, and are studying an apparatus in the EPS, namely, HeNB (Home eNodeB: Home Base Station) as a compact base station that is installed at home.

In the HeNB, a small-scale wireless cell called femtocell is constructed, and a UE (User Equipment: mobile terminal apparatus) is included using the same radio access technique as that of a standard base station. The HeNB is then connected to a core network of a mobile communication system via broadband line, and relays communication data of the included UE.

NPL 2 listed below discloses an architecture candidate to implement a Local IP Access through the HeNB. The Local IP Access refers to a function to provide direct connectivity to a network such as a home IP network (hereinafter referred to as a "home network") to which the HeNB is directly connected. The UE is thus able to communicate with another information terminal (such as a digital video recorder or a printer) connected to the home network without being via the core network of the mobile communication system.

On the other hand, in the EPS, MBMS (Multimedia Broadcast/Multicast Service) specifications have been formulated as a method of providing multicast service to the UE via the core network (for example, reference is made to NPL 3).

In MBMS, BM-SC (Broadcast-Multicast Service Centre) and MBMS-GW are installed in the core network of the mobile communication system, and the UE is able to receive multicast data when BM-SC, MBMS-GW, and a base station establish a delivery path of multicast data.

Also available is a service discovery protocol, employing multicast of UPnP (Universal Plug and Play), as a method of automatically finding services (such as a "print service" provided by a printer device) which apparatuses in a Local Area Network (LAN) such as a home network mutually provide to each other (for example, reference is made to NPL 4).

In terms of user convenience, a function implemented at UPnP is preferably available on the UE connected via a Local IP Access. Although NPL 2 describes a request condition on the use of multicast service through the Local IP Access, but fails to describe specific implementation means of the function. The function cannot be implemented.

CITATION LIST

Non Patent Literature

NPL 1: 3GPP TS23.401 General Packet Radio Service (GPRS) enhancements for Evolved Universal Terrestrial Radio Access Network (E-UTRAN) access NPL 2: 3GPP TR 23.829 Local IP Access and Selected IP Traffic Offload NPL 3: 3GPP TS 23.246 Multimedia Broadcast/Multicast Service; Architecture and functional description NPL 4: UPnP Device Architecture 1.1

SUMMARY OF INVENTION

Technical Problem

A requirement set up in the architecture candidate to implement the Local IP Access disclosed in NPL 2 is that a UE shipped to the market prior to the formulation of Local IP Access specifications also be supported and that the Local IP Access be implemented without the need for modifying the UE. Therefore, the UE is not affected by whether communication data is transferred via a core network or via the Local IP Access. In accordance with the conventional specifications, the UE determines, based on flow identification information called TFT (Traffic Flow Template), which TFT communication data to be transmitted corresponds to, and simply transmits the communication data via a bearer (a logic path established between the UE and a base station at each QoS level) associated with the TFT.

The UE may use a multicast service. In accordance with a multicast group join procedure described in NPL 3, the UE makes a join request to a multicast group by transmitting an IGMP (Internet Group Management Protocol) Join message in IPv4 communications, or transmitting a MLD (Multicast Listener Discovery) Join message in IPv6 communications. To join any multicast group, however, the message is transmitted to the same address ("FF02::16" in IPv6 or "224.0.0.221" in IPv4). The TFT identifies a flow by destination address, a protocol number, a port number, etc. Therefore, with the TFT alone, the UE has difficulty determining whether the join request is a request for the multicast service via the Local IP Access, selecting a bearer, and transmitting the join request. As a result, the UE transmits the join request to a bearer connected to the core network, and a transmitted join request message is simply received by an access control apparatus called SGW (Serving GW) in the core network that is a default router of the UE.

A method of performing a procedure is contemplated in which an apparatus in the core network, such as MME (Mobility Management Entity), working as a position management apparatus such as SGW, determines whether the multicast group join request transmitted by the UE is a join request for the Local IP Access or a join request message for a MBMS service, and delivers multicast communications requested by the UE.

However, a multicast group on each home network operated by each user at home is managed in the core network that is supposed to be mainly operated by a mobile communication operator, such a management is difficult because a large amount of management costs is incurred.

The UE needs to determine whether the join request thereof is a join request for the Local IP Access or a join request message for the MBMS service, and then to transmit the join request. HeNB then performs a multicast reception procedure responsive to the join request.

However, the UE has no such determination means. Furthermore, the UE has no means for transmitting to HeNB an explicit indication responsive to results of such determination as to whether the join request thereof is a join request for the Local IP Access or a join request message for the MBMS service. HeNB has no means to receive the multicast data.

Because of the above problems, the UE cannot enjoy the multicast services provided by the home network, and cannot use the functions of the UPnP and the like.

The present invention has been developed in view of the problems. The object of the present invention is to provide a mobile communication system or the like, in which a mobile station apparatus connected to a home base station apparatus determines whether a multicast join request is for a multicast group via a Local IP Access, and then transmits the multicast join request, and a home base station apparatus establishes a multicast session appropriately to the home network or the core network in response to a determination result of the mobile station apparatus.

Solution to Problem

To solve the problems, the mobile communication system of the present invention has features described below.

A mobile communication system of the present invention includes a home network and a core network connected to each other via an external network, the home network including a home base station apparatus having a mobile station apparatus connected thereto, and the core network including a position management apparatus and an access control apparatus connected thereto. The mobile station apparatus establishes a first bearer that communicates with the home network and a second bearer that communicates with the core network. In the transmission of a multicast join request, the mobile station apparatus transmits the multicast join request by selecting the first bearer if the multicast join request is addressed to the home network, or by selecting the second bearer if the multicast join request is addressed to the core network.

In the mobile communication system of the present invention, the mobile station apparatus includes multicast address storage means that stores a multicast address serving as an address for the multicast join request addressed to the home network. In the transmission of the multicast join request, the mobile station apparatus transmits the multicast join request by selecting the first bearer if the multicast address contained in the multicast join request is stored on the multicast address storage means.

In the mobile communication system of the present invention, the home base station apparatus transmits to the core network the multicast join request received via the second bearer.

A mobile communication system of the present invention includes a home network and a core network connected to each other via an external network, the home network including a home base station apparatus having a mobile station apparatus connected thereto, and the core network including a position management apparatus and an access control apparatus connected thereto. The mobile station apparatus establishes a first bearer that communicates with the home network and a second bearer that communicates with the core network. Upon receiving a packet via the first bearer from the mobile station apparatus, the home base station apparatus determines whether the packet is a multicast join request. If the packet is the multicast join request, the home base station apparatus executes a join procedure to a multicast group in the home network.

A mobile station apparatus of the present invention is connected to a mobile communication system including a home network and a core network connected to each other via an external network, the home network including a home base station apparatus having the mobile station apparatus connected thereto, and the core network including a position management apparatus and an access control apparatus connected thereto. The mobile station apparatus establishes a first bearer that communicates with the home network and a second bearer that communicates with the core network. In the transmission of a multicast join request, the mobile station apparatus transmits the multicast join request by selecting the first bearer if the multicast join request is addressed to the home network, or by selecting the second bearer if the multicast join request is addressed to the core network.

A home base station apparatus of the present invention is connected to a mobile communication system including a home network and a core network connected to each other via an external network, the home network including the home base station apparatus having a mobile station apparatus connected thereto, and the core network including a position management apparatus and an access control apparatus connected thereto. The mobile station apparatus has established a first bearer that communicates with the home network and a second bearer that communicates with the core network. Upon receiving a packet via the first bearer from the mobile station apparatus, the home base station apparatus determines whether the packet is a multicast join request. If the packet is the multicast join request, the home base station apparatus executes a join procedure to a multicast group in the home network.

A communication method of the present invention is a method of a mobile communication system including a home network and a core network connected to each other via an external network, the home network including a home base station apparatus having a mobile station apparatus connected thereto, and the core network including a position management apparatus and an access control apparatus connected thereto. The mobile station apparatus has established a first bearer that communicates with the home network and a second bearer that communicates with the core network. In the transmission of a multicast join request, the mobile station apparatus transmits the multicast join request by selecting the first bearer if the multicast join request is addressed to the home network, or by selecting the second bearer if the multicast join request is addressed to the core network.

Advantageous Effects of Invention

According to the present invention, an appropriate multicast session establishment procedure is selected while compatibility with an existing system is maintained. The UE may use a multicast service provided in a Local IP Access environment.

BRIEF DESCRIPTION OF THE DRAWINGS

FIG. 2 is a configuration diagram of MME in the first embodiment.

FIG. 3 illustrates an example of a subscription database of the MME in the first embodiment.

FIG. 4 illustrates an example of EPS bearer context of the MME in the first embodiment.

FIG. 11 illustrates an example of a multicast address setting table of the UE in the first embodiment.

FIG. 12 illustrates an example of an EPS bearer context of the UE in the first embodiment.

FIG. 22 illustrates an example of a multicast session establishment process sequence for the Local IP Access in the second embodiment.

FIG. 23 illustrates an example of a multicast session establishment process sequence for the Local IP Access in a modification.

DESCRIPTION OF EMBODIMENTS

Best mode embodiments for carrying out the invention are described below with reference to the drawings. One example of the embodiments relating to a mobile communication system to which the present invention applies is described in detail with reference to the drawings.

1. First Embodiment

Figure 1:
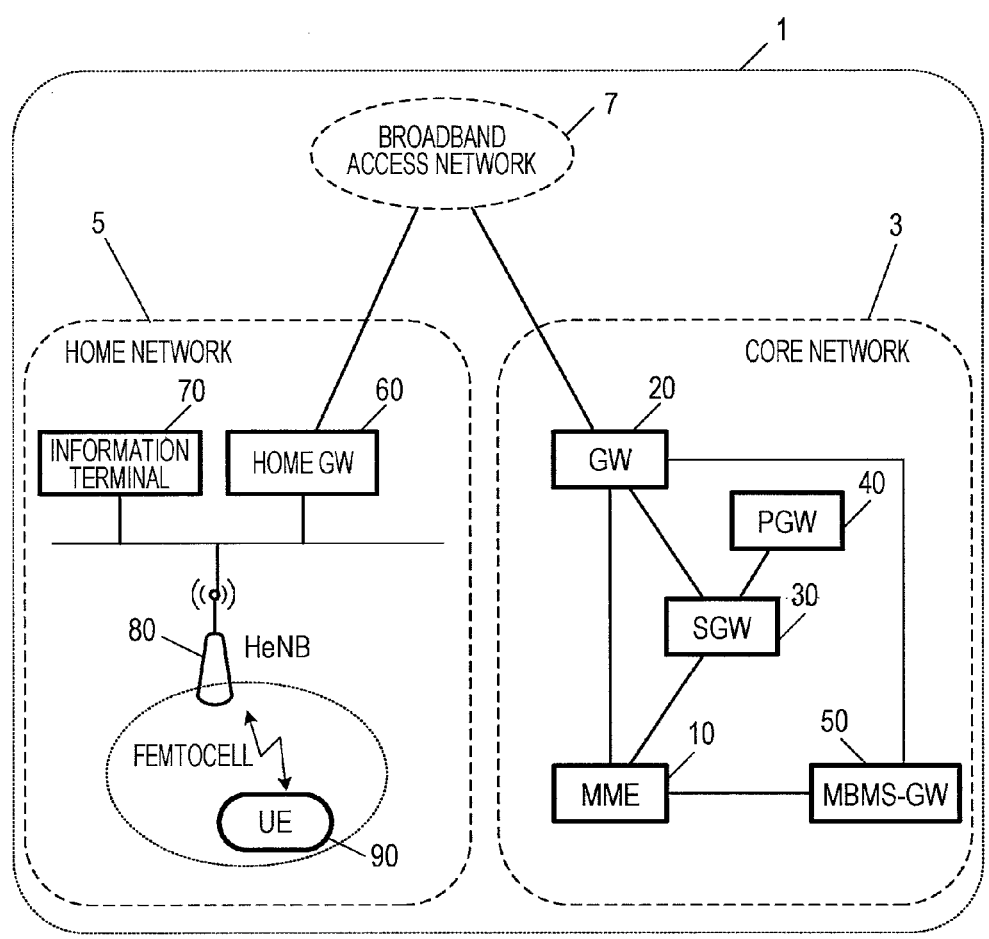
FIG. 1 is a configuration diagram of a mobile communication system of a first embodiment.

A first embodiment of the present invention is described first with reference to the drawings.
1.1 Summary of Mobile Communication System
FIG. 1 generally illustrates a mobile communication system 1 of the present embodiment. As illustrated, the mobile communication system 1 includes core network 3, home network 5, and broadband access network 7. The core network 3 and the home network 5 are interconnected to each other via the broadband access network 7.

The broadband access network 7 is a wired access network that performs communications in a broadband, and is, for example, constructed of ADSL, optical fiber, etc. The broadband access network 7 is not limited to these, and may be a wireless access network such as WiMAX.

The core network 3 is a mobile communication network operated by a mobile communication operator, and includes MME 10, GW 20, SGW 30, PGW (Packet data network GW) 40, and MBMS-GW 50.

The MME 10 is an entity that performs signaling, and is a position management apparatus that performs position management of a mobile station apparatus (UE 90) and initiates an EPS bearer establishment procedure. The phrase EPS bearer is a logical path that is established between the PGW 40 and the UE 90, and user IP packets are transferred on it. A particular QoS level may be configured at the EPS bearer, and the EPS bearer may be associated with the TFT.

The TFT is defined as a set of filter information that identifies a flow as communication data, and a destination address and a port number may be specified in each piece of filter information. The TFT thus identifies a traffic flow of a particular application and a flow with a particular communication partner.

The GW 20 functions as a gateway between HeNB 80 installed in the home network 5 and an apparatus in the core network. Communications between the MME 10 and the HeNB 80, communications between the SGW 30 and the HeNB 80, and communications between the MBMS-GW 50 and the HeNB 80 are performed via the GW 20.

The SGW 30 is an access control apparatus that transfers a packet between the PGW 40 and the HeNB 80. It is noted that there are cases that the PGW 40 and the SGW 30 are physically integrated into the same node.

The PGW 40 is a gateway apparatus that is connected to an external PDN (Packet Data Network), such as the Internet, and functions as a gateway that connects the core network 3 to the PDNs. The PGW 40 also transfers communication data of UE 90 to the SGW 30.

The MBMS-GW 50 is an apparatus that transfer multicast data of the MBMS to the HeNB 80. The MBMS-GW 50 is connected to the HeNB 80 via the GW 20 and is also connected to the MME 10.

The home network 5 may be a home network at home or a corporate network in a company. The home network 5 includes home GW 60, information terminal 70, HeNB 80, and UE 90. The home network 5 is also connected to the broadband access network 7.

The home GW 60 is a gateway apparatus arranged between the home network and the broadband access network, and is a conventional broadband router such as an ADSL modem built-in router.

The information terminal 70 is an apparatus that is IP communicable and is connected to the home network. The information terminal 70 may be a printer, a digital video recorder, or a PC connected at home. The information terminal 70 supports UPnP, and announces service available within the home network (such as "print service"). A plurality of information terminals are typically connected. In the present embodiment, however, the single information terminal 70 is described for convenience of explanation.

The HeNB 80 is installed in the home network, but supports a UE as a base station provided by a core network operator. Typically, the HeNB 80 is a base station of 3GPP LTE (Long Term Evolution) forming a femtocell.

The UE 90 is a mobile communication terminal to be connected to the HeNB, and includes a 3GPP LTE communication interface for connection with the HeNB 80.
1.2 Apparatus Configuration
In succession, the configuration of each apparatus is described below with reference to the drawings. Since the GW 20, the MBMS-GW 50, and the PGW 40 are constructed in the same manner as a conventional apparatus in the mobile communication system using EPS, the detailed discussion thereof is omitted herein.

The home GW 60 is constructed in the same manner as a conventional broadband router apparatus, and the detailed discussion thereof is omitted herein.

1.2.1 Configuration of MME

FIG. 2 illustrates the configuration of the MME 10 of the present embodiment. In the MME 10, a controller unit 100 is connected to transceiver unit 110 and memory unit 130 via a bus.

The controller unit 100 is a function unit that controls the MME 10. The controller unit 100 reads a variety of programs stored on the memory unit 130 and then executes the read programs, thereby performing a variety of processes.

The transceiver unit 110 is a function unit that is wire-connected to a router or a switch, and transmits and receives a packet. The transceiver unit 110 transmits and receives a packet through Ethernet (registered trademark), which is widely used as a network connection method.

The memory unit 130 is a function unit that stores a program and data for use in a variety of operations of the MME 10. Furthermore, the memory unit 130 stores subscription DB (database) 132 and EPS bearer context 134.

FIG. 3 illustrates an example of the subscription DB 132. The subscription DB 132 is a database that stores a UE ID (e.g., "UE1"), a CSG ID (e.g., "CSG1"), and permission of a Local IP Access (e.g., "authorized") in association with each other. The CSG (Closed Subscriber Group) ID uniquely identifies the HeNB 80. The subscription DB 132 determines whether the Local IP Access is available the HeNB 80.

FIG. 4 illustrates an example of the EPS bearer context 134. The EPS bearer context 134 stores a UE ID (e.g., "UE1"), a bearer ID (e.g., "bearer ID 1"), the UL TFT (Uplink TFT) (e.g., "all"), and LIPA (Local IP Access) setting (e.g., "OFF") in association with each other, and thus manages a state of an EPS bearer set for each UE 90.

The bearer ID is an ID that identifies the EPS bearer, and the LIPA setting indicates whether a Local IP Access is used on each EPS bearer. The UL TFT identifies a flow (uplink flow) transmitted from the UE 90.

A bearer established by the UE 90 is learned by referring to the bearer context, and the bearer context also manages the flow transferred to each bearer. Furthermore, the bearer context manages the flow as to whether the Local IP Access is used or not on each bearer. For example, as illustrated in FIG. 4(B), UE1 has established bearer 2 in which the Local IP Access is available. The bearer context specifies "destination 2001:2:3:4//64" as the UL TFT, and manages the flow so that the flow addressed to an apparatus connected to the home network is communicated through the bearer 2.

1.2.2 Configuration of SGW

Figures 5, 6:
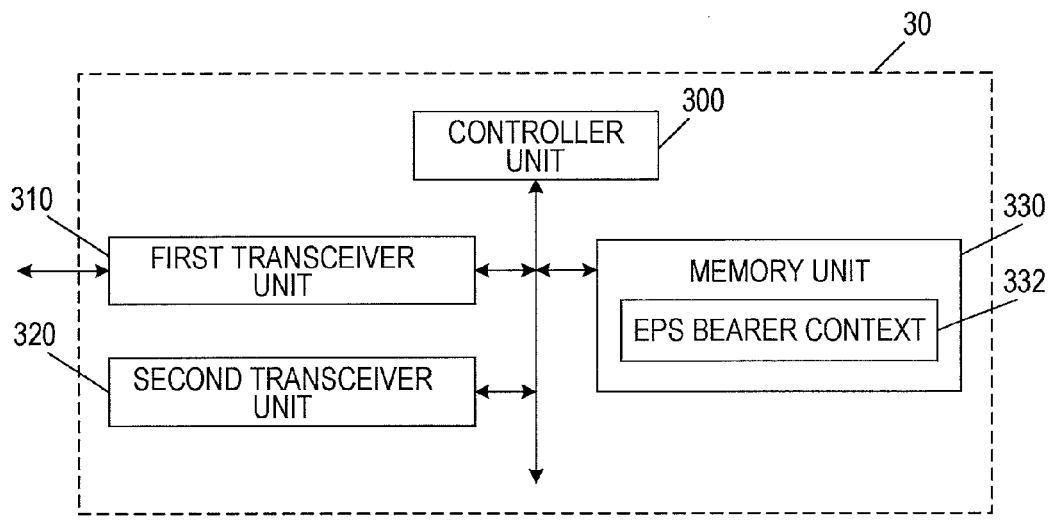
FIG. 5 is a configuration diagram of an SGW in the first embodiment.
FIG. 6 illustrates an example of an EPS bearer context of the SGW in the first embodiment.

FIG. 5 illustrates a configuration of the SGW 30 of the present embodiment. In the SGW 30, a controller unit 300 is connected to first transceiver unit 310, second transceiver unit 320, and memory unit 330 via a bus.

The controller unit 300 is a function unit that controls the SGW 30. The controller unit 300 reads and executes a variety of programs stored on the memory unit 330, thereby performing processes thereof.

The first transceiver unit 310 and the second transceiver unit 320 are function units that are connected to each apparatus wiredly or wirelessly, transmit and receive data and packets. For example, the first transceiver unit 310 and the second transceiver unit 320 transmit and receive the data and the packets via Ethernet (registered trademark) typically available as a network connection method. The first transceiver unit 310 transmits and receives data at a lower layer, and the second transceiver unit 320 decomposes data received from an upper layer, and transmits the decomposed data as a packet. The second transceiver unit 320 also has a function of transferring a received packet to the upper layer.

The memory unit 330 is a function unit that stores a program, data, and the like needed for a variety of operations of the SGW 30. Furthermore, the memory unit 330 stores an EPS bearer context 332.

FIG. 6 illustrates an example of the EPS bearer context 332. Like the EPS bearer context 134 of the MME 10, the EPS bearer context 332 stores a UE ID (e.g., "UE1"), a bearer ID (e.g., "bearer ID 1"), the UL TFT (Uplink TFT) (e.g., "all"), and the LIPA (Local IP Access) setting (e.g., "OFF") in association with each other, and thus manages a state of the EPS bearer set for each UE 90.

1.2.3 Configuration of HeNB

Figures 7, 8:
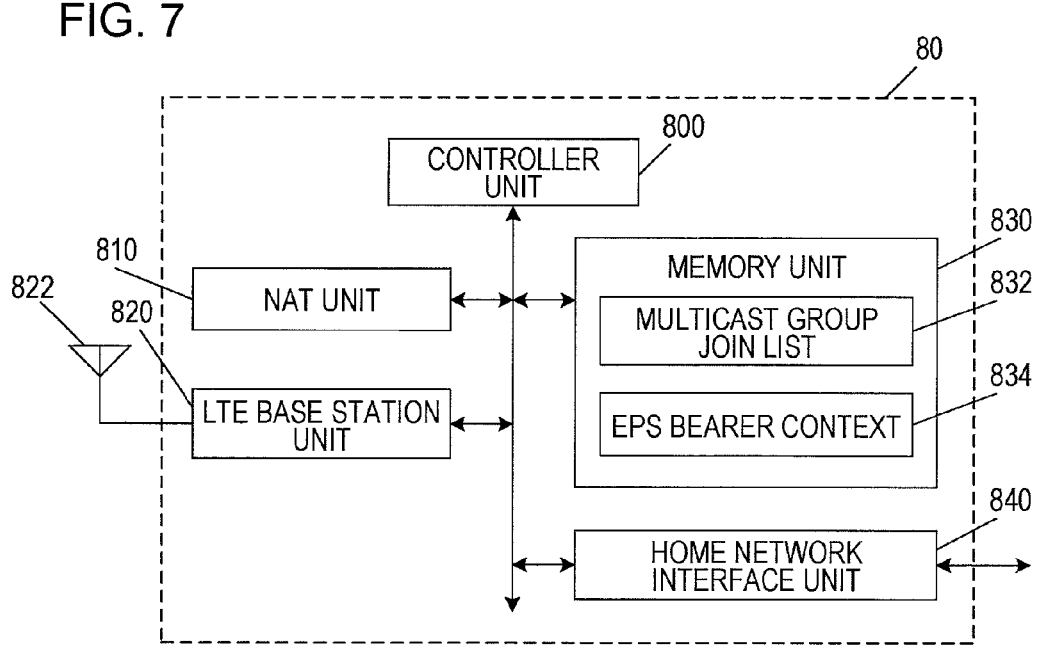
FIG. 7 is a configuration diagram of an HeNB in the first embodiment.
FIG. 8 illustrates an example of a multicast group join list of the HeNB in the first embodiment.

FIG. 7 illustrates a configuration of the HeNB 80 of the present embodiment. In the HeNB 80, a controller unit 800 is connected to NAT (Network Address Translation) unit 810, LTE base station unit 820, memory unit 830, and home network interface unit 840 via a bus.

The controller unit 800 is a function unit that controls the HeNB 80. The controller unit 800 reads and executes a variety of programs stored on the memory unit 830, thereby performing a process thereof.

The NAT unit 810 receives a packet from the LTE base station unit 820, rewrites a transmission source IP address, and then transfers the packet to the home network interface unit 840 in accordance with a transmission destination IP address.

The NAT unit 810 receives a packet from the home network interface unit 840, rewrites a transmission destination IP address of the packet, and then transfers the packet to the LTE base station unit 820.

The LTE base station unit 820 functions as a base station of E-UTRA, and is a function unit that supports a UE. The LTE base station unit 820 also connects to an external antenna 822.

The memory unit 830 is a function unit that stores programs and data needed for a variety of operations of the HeNB 80. The memory unit 830 includes a multicast group join list 832 and an EPS bearer context 834.

FIG. 8 illustrates an example of the multicast group join list 832. The multicast group join list 832 stores a multicast address (e.g., "FF02::C"), an ID of a group join UE joining the multicast address group (e.g., "UE1"), and a bearer ID that the UE uses for a Local IP Access (e.g., "bearer 2") in association with each other. The multicast group join list 832 thus manages the UE joining the multicast address group on the home network 5 via the HeNB 80.

Figures 9, 10:
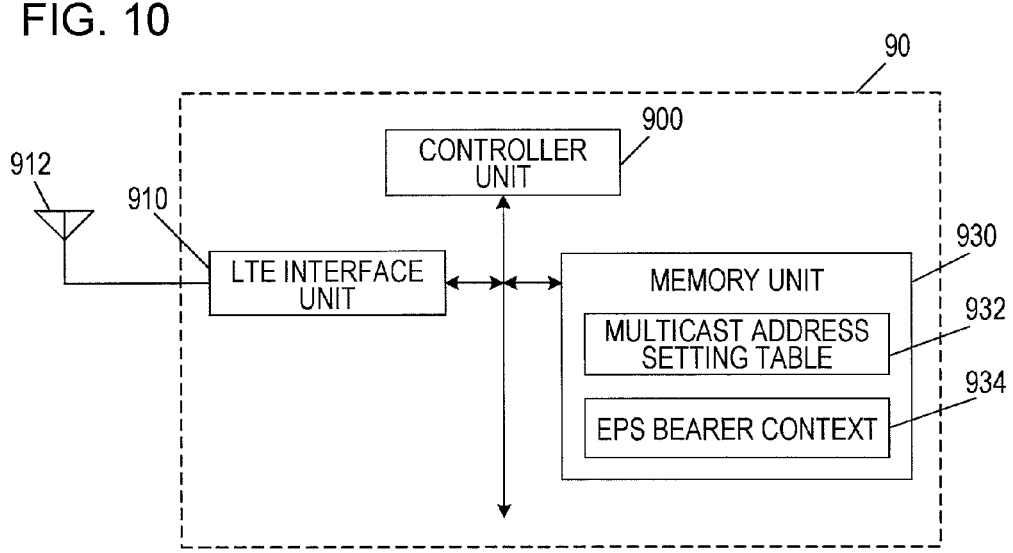
FIG. 9 illustrates an example of the EPS bearer context of the HeNB in the first embodiment.
FIG. 10 is a configuration diagram of a UE in the first embodiment.

FIG. 9 illustrates an example of the EPS bearer context 834. As illustrated in FIG. 9(A), for example, like the EPS bearer context 134 of the MME 10, the EPS bearer context 834 stores a UE ID (e.g., "UE1"), a bearer ID (e.g., "bearer ID 1"), a UL TFT (e.g., "all"), and a LIPA setting (e.g., "OFF") in association with each other, and thus manages a state of the EPS bearer set for each UE.

Upon receiving a flow from the UE 90, the HeNB 80 determines which EPS bearer has been used in the transmission of the flow. If the LIPA setting of the EPS bearer is "ON," the HeNB 80 directly transmits the flow to within the home network 5 from the home network interface unit 840 via the NAT unit 810. If the LIPA setting is "OFF," the HeNB 80 transfers the flow to the SGW 30.

The home network interface unit 840 is a function unit that transmits and receives a packet to and from another apparatus in the home network 5. For example, the home network interface unit 840 transmits and receives a packet through Ethernet (registered trademark) typically used as a network connection method.

1.2.4 Configuration of UE

Configuration of the UE 90 as a mobile station in the present embodiment is described. Specific examples of the UE 90 include a mobile terminal and a terminal such as a PDA connected to a mobile communication system via a wireless access interface. As illustrated in FIG. 10, a controller unit 900 is connected to a LTE interface unit 910, and a memory unit 930 via a bus.

The controller unit 900 is a function unit that controls the UE 90. The controller unit 900 reads and executes a variety of programs stored on the memory unit 930, thereby performing a variety of processes thereof.

The LTE interface unit 910 is a function unit that connects the UE 90 to the HeNB 80. The LTE interface unit 910 is connected to an external antenna 912.

The memory unit 930 is a function unit that stores programs and data needed for a variety of operations of the UE 90. Furthermore, the memory unit 930 stores a multicast address setting table 932 and an EPS bearer context 934.

FIG. 11 illustrates an example of the multicast address setting table 932. The multicast address setting table 932 is a database that stores an IP address of a multicast group joined via the Local IP Access.

FIG. 12 illustrates an example of the EPS bearer context 934. Like the EPS bearer context 134 of the MME 10, the EPS bearer context 934 stores a UE ID (e.g., "UE1"), a bearer ID (e.g., "bearer ID 1"), a UL TFT (e.g., "all"), and a LIPA setting (e.g., "OFF") in association with each other, and thus manages a state of the EPS bearer set for each UE. When the UE 90 transmits a flow, the UE 90 searches for the UL TFT to which the flow corresponds. If such UL TFT is present, the UE 90 transmits the flow using an EPS bearer associated with the UL TFT.

1.2.5 Configuration of Information Terminal

Figure 13:
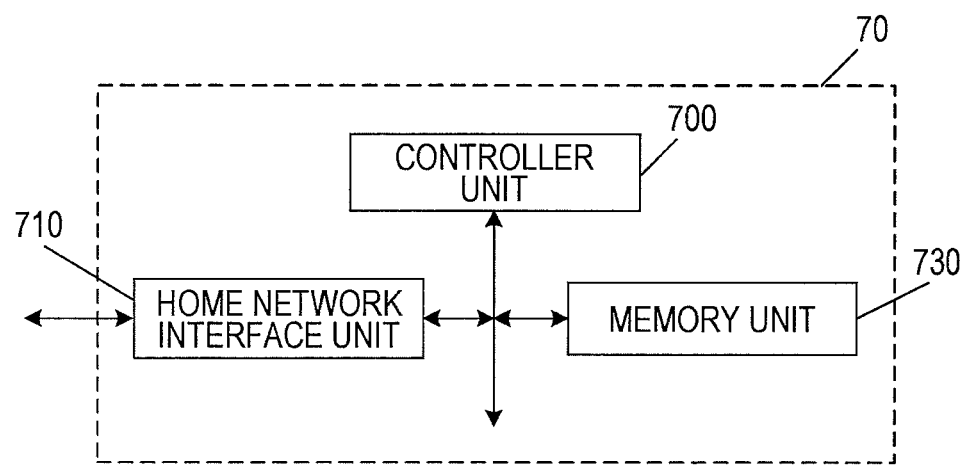
FIG. 13 is a configuration diagram of an information terminal in the first embodiment.

FIG. 13 illustrates a configuration of the information terminal 70 of the present embodiment. In the information terminal 70, a controller unit 700 is connected to a home network interface unit 710 and a memory unit 730 via a bus.

The controller unit 700 is a function unit that controls the information terminal 70. The information terminal 70 reads and executes a variety of programs stored on the memory unit, thereby performing a variety of processes.

The home network interface unit 710 is a function unit that transmits and receives a packet to and from another apparatus within the home network 5. For example, the home network interface unit 710 transmits and receives a packet via Ethernet (registered trademark) and the like, typically used as a network connection method.

The memory unit 730 is a function unit that stores programs and data needed for a variety of operations of the information terminal.

1.3 Description of Process

Described below referring to the drawings is a procedure of the UE 90 that transmits and receives multicast data using a Local IP Access provided by the HeNB 80 in the network of FIG. 1.

1.3.1 Connection Process of UE

Figure 14:
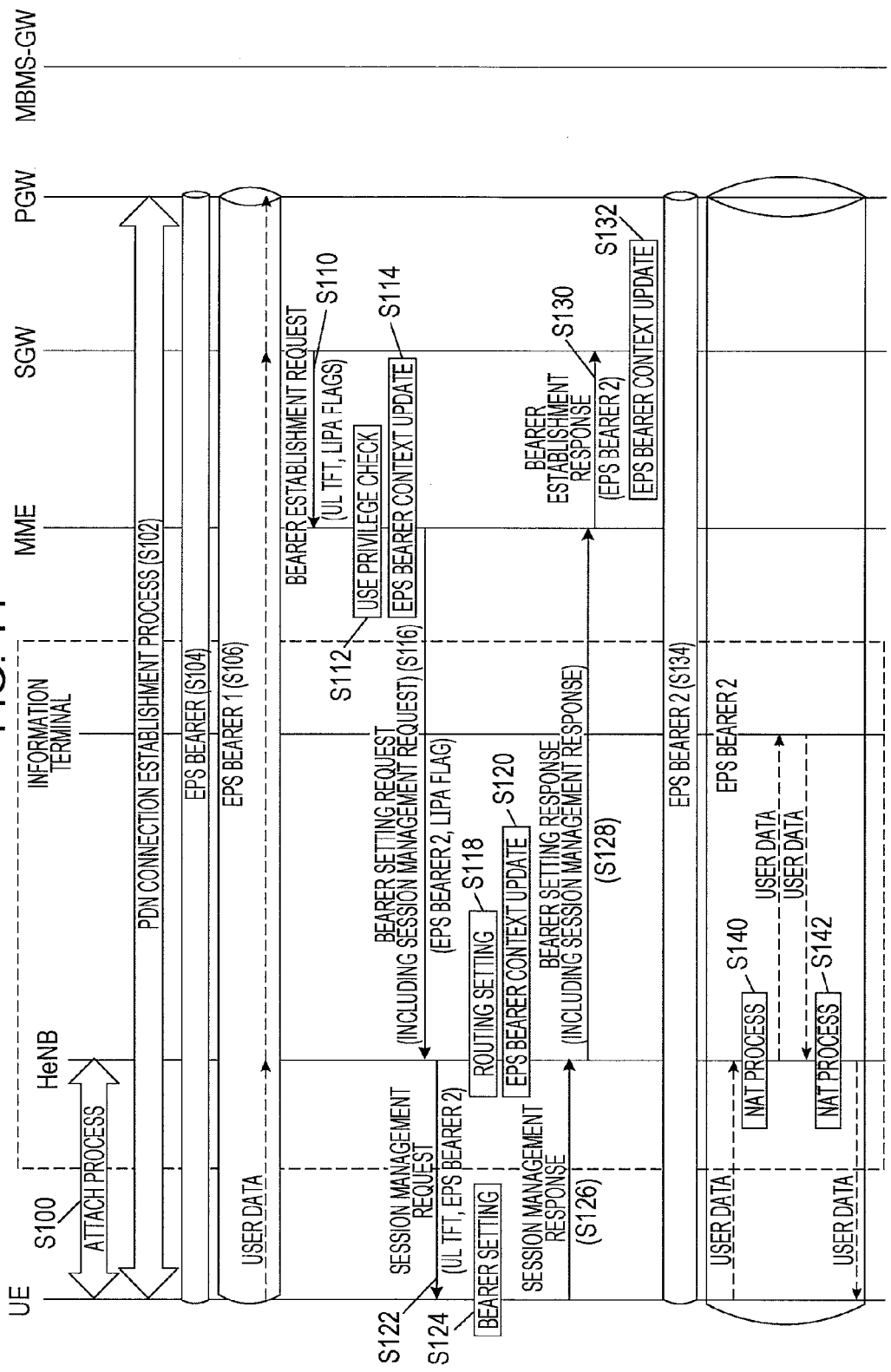
FIG. 14 illustrates an example of an Attach process of the UE to the HeNB and a Local IP Access establishment process sequence in the first embodiment.

The UE 90 starts an Attach process on the HeNB 80 for connection. The connection procedure performed then is described in detail with reference to FIG. 14.

The UE 90 performs the Attach process with the HeNB 80 in accordance with the conventional technique formulated in NPL 1, and is then connected to the HeNB 80 (S100).

In accordance with the conventional technique, the UE 90 further performs a PDN connection establishment process to the PGW 40 (S102). The PDN connection refers to a logical path established between the UE 90 and the PGW 40, and a plurality of EPS bearers may be established in a single PDN connection. It is noted that the PDN connection establishment process is performed among the UE 90, the HeNB 80, the MME 10, the SGW 30, and the PGW 40.

When the PDN connection establishment process is complete, an EPS bearer 1 is established as a default bearer between the UE 90 and the PGW 40 (S104). The EPS bearer context 134 of the MME 10 is set as illustrated in FIG. 4(A). Similarly, the EPS bearer context 332 of the SGW 30 is set as illustrated in FIG. 6(A), the EPS bearer context 834 of the HeNB 80 is set as illustrated in FIG. 9(A), and the EPS bearer context 934 of the UE 90 is set as illustrated in FIG. 12(A). A default bearer is used to transmit and receive a flow that is not associated with a specific EPS bearer.

A communication flow transmitted from the UE 90 thereafter is transmitted via the EPS bearer 1 in accordance with the EPS bearer context 934 of the UE 90 (S106).

1.3.2 Local IP Access Establishment Process of UE

The UE 90 having completed the PDN connection establishment process then starts establishing an EPS bearer for the Local IP Access in accordance with the conventional technique formulated in NPL 2.

The Local IP Access EPS bearer establishment may be started in response to a notification from a QoS management apparatus in the core network such as PCRF (Policy and Charging Rules Function), may be started in response to the completion of the PDN connection establishment, or may be started in response to subscriber information in the join management apparatus in the core network that authorizes the UE 90 for the Local IP Access. Other means may be used to start the Local IP Access EPS bearer establishment.

The SGW 30 first transmits a bearer establishment request to the MME 10 (S110). The bearer establishment request includes identification information of a communication flow as a target of the Local IP Access (UL TFT), and an ID that instructs communications via the Local IP Access using the establishment requested bearer (hereinafter referred to as a LIPA flag). The UL TFT includes an IP address prefix (such as "2001:2:3:4::/64" or the like) assigned to the home network.

The IP address prefix may be obtained by managing the IP address prefix in the core network at the installation of the HeNB 80, and then by referencing information statically set in this way. Alternatively, the IP address prefix may be obtained in a dynamic fashion, i.e., by causing the HeNB to notify of the IP address prefix through the connection procedure performed heretofore.

The MME 10 receives the bearer establishment request, and checks the permission with a subscription DB using CSGID (CSG1) of the HeNB 80 connected to the UE 90 and the UE ID in accordance with the conventional method (S112). The MME 10 then checks whether the UE 90 has the permission of the Local IP Access using the HeNB 80. If the UE 90 has no permission, the MME 10 transmits a bearer establishment denial to the SGW 30, and ends the EPS bearer establishment process of the Local IP Access.

If the UE 90 has the permission, the MME 10 assigns a new EPS bearer (bearer 2) to the UE 90 in response to a received bearer establishment request, updates the EPS bearer context 134 as illustrated in FIG. 4(B) (S114), and stores the availability of the Local IP Access to the bearer 2 and flow information which is communicated through the bearer 2.

Furthermore, the MME 10 generates a session management request. The session management request includes the UL TFT, the EPS bearer ID (bearer 2), and the LIPA flag. The MME 10 then transmits to the HeNB 80 a bearer setting request including the session management request (S116).

The bearer setting request includes the bearer ID (bearer 2) of the EPS bearer for use in the Local IP Access, and the LIPA flag.

The HeNB 80 receives the bearer setting request, and sets routing information so that a communication flow received from the UE 90 via the EPS bearer 2 is not transferred to the SGW 30 but directly transferred to the home network 5 connected to the HeNB 80 (S118). The HeNB 80 also updates the EPS bearer context 834 as illustrated in FIG. 9(B) (S120), and then stores the availability of the Local IP Access to the bearer 2 and flow information communicated via the bearer 2. The HeNB 80 further transfers to the UE 90 the session management request included in the bearer setting request (S122).

In accordance with the UL TFT and the EPS bearer ID included in the session management request, the UE 90 sets a communication flow corresponding to the UL TFT to be transmitted via the EPS bearer 2 to the HeNB 80 (S124). The UE 90 updates the EPS bearer context 934 as illustrated in FIG. 12(B), and stores the LIPA setting in accordance with the flow information communicated via the bearer 2 and the LIPA flag. The UE 90 then transmits a session management response to the HeNB (S126).

The HeNB 80 receives the session management response, includes the session management response in a bearer setting response, and transmits the bearer setting response to the MME 10 (S128).

The MME 10 transmits to the SGW 30 a bearer establishment response including the bearer ID (bearer 2) of the established EPS bearer (S130).

The SGW 30 receives the bearer establishment response, updates the EPS bearer context 332 as illustrated in FIG. 6(B) (S132), and stores the availability of the Local IP Access to the bearer 2 and flow information communicated via the bearer 2.

The Local IP Access establishment process (EPS bearer 2) of the UE 90 is thus complete (S134). In this way, out of the communication flow transmitted from the UE 90, the HeNB 80 does not transfer to the core network 3 a flow corresponding to flow identification information specified by the UL TFT but directly transfers the flow corresponding to the flow identification information to the home network 5. The UE 90 can thus directly communicate with the information terminal 70 without being transferred via the core network 3.

Similarly, communication data transmitted from the information terminal 70 and addressed to the UE 90 is transferred via the HeNB 80 without being transferred via the core network 3. Since the UE 90 performs communications using an IP address assigned by the PGW 40, an inconsistency occurs with an IP address system of the home network 5. For this reason, the HeNB 80 performs an NAT (Network Address Translation) process in accordance with the conventional technique described in NPL 2, and rewrites the IP address (S140 and S142).

1.3.3 Multicast Session Establishment Process (First Embodiment)

Next, the UE 90 performs a join procedure to a multicast group to join the multicast group provided in the home network 5, for example, to discover a service such as UPnP. The join procedure is described below with reference to FIG. 15.

The UE 90 first performs a bearer selection process (S150), thereby selecting a bearer to transmit a multicast group join request thereto. The join request is made by transmitting an IGMP join message or an MLD join message including an IP address (e.g., "FF02::C" used in UPnP) of the multicast group which the UE 90 wants to join. In accordance with the conventional method, each message includes a transmission destination of "FF02::16" in IPv6, or "224.0.0.22" in IPv4 regardless of the multicast address group of the join request.

Figure 16:
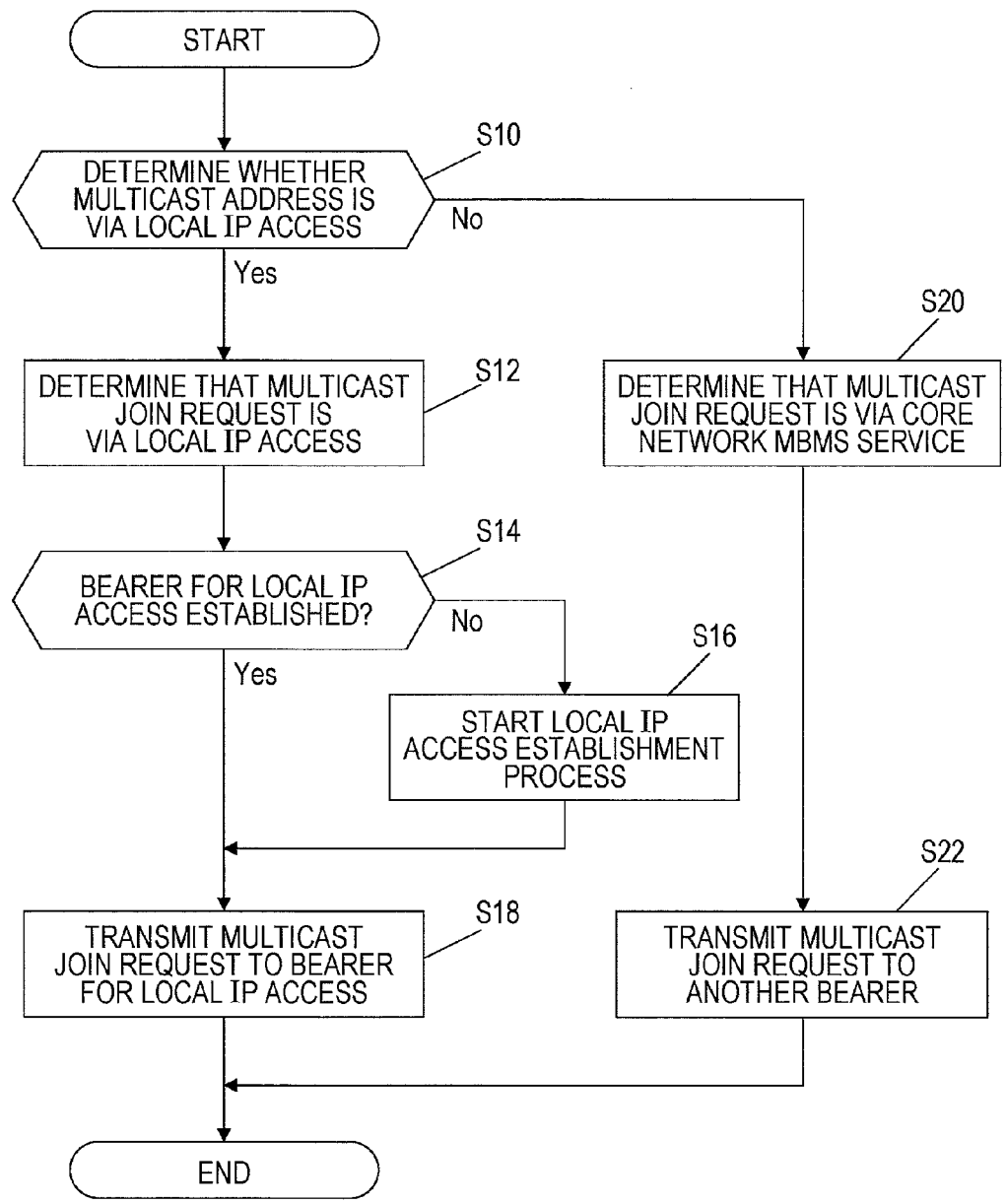
FIG. 16 is a flowchart illustrating a bearer selection process of the UE in the first embodiment.

Further in the transmission of the join request message, the UE 90 selects a bearer, and transmits the message using the selected bearer. The bearer selection process is described with reference to FIG. 16.

Bearer Selection Process

The UE 90 determines whether a multicast address included in the join request message is present in a list of multicast addresses of the multicast address setting table 932, thereby determining whether the multicast address is via the Local IP Access (S10).

The multicast address setting table 932 manages a multicast address set for the Local IP Access as the multicast group in the home network 5. The multicast address setting table 932 is statically preset by a user who supervises the home network 5. Alternatively, a multicast address for use in the home network 5 is assigned to the entire communication system, and is then statically preset at the shipment of the UE 90.

If the multicast address is via the Local IP Access (yes from step S10), the UE 90 determines that the multicast group join request of the UE 90 is to request to receive multicast data via the Local IP Access (step S12). The UE 90 can verify that an EPS bearer for the Local IP Access has been established, by checking whether a bearer with the LIPA setting being ON is present in the EPS bearer context 834 (step S14).

If it is verified that an EPS bearer for the Local IP Access has been established (yes from step S14), the UE 90 selects a bearer for the Local IP Access (bearer 2), transmits a multicast join request, and then completes the bearer selection process (step S18).

If it is not verified in step S14 that an EPS bearer for the Local IP Access has been established (no from step S14), the UE 90 notifies the MME 10 or the SGW 30 of a request. The UE 90 establishes a bearer by executing a Local IP Access establishment process (S16), transmits the multicast join request via the established bearer, and then completes the bearer selection process (S18).

If the multicast address is not via the Local IP Access (no from step S10), the UE 90 determines that the multicast address is a join request to the multicast group in an MBMS service of the core network (S20). The UE 90 then references the EPS bearer context, selects a bearer with the LIPA setting being OFF (bearer 1), transmits a multicast join request via the bearer not for the Local IP Access (step S22), and then completes the bearer selection process.

In a conventional manner, a bearer for a transmission packet has been selected in accordance with TFT, and the packet has been transmitted to the selected bearer. Unlike the conventional manner, in accordance with the present embodiment, the UE 90 selects a bearer in accordance with the multicast address included in the multicast join request message, in which bearer selection cannot be performed from information elements of the TFT, such as a transmission source address, a transmission destination address, and a protocol number.

Turning back to FIG. 15, the procedure of the multicast data transmission and reception of the UE 90 is described.

Subsequent to the bearer selection process (S150), the UE 90 transmits the multicast join request message via the EPS bearer for the Local IP Access (S152).

In a conventional manner, the HeNB 80 performs a NAT process on a packet transmitted using the bearer 2 and then directly transmits the packet to the home network. Unlike the conventional manner, the packet is transmitted via the bearer for the Local IP Access and is a multicast join request by a protocol number of the packet. The HeNB 80 thus joins the group of the multicast address specified by the multicast join request message.

In order to join the group of the specified multicast address, the HeNB 80 transmits IGMP Join or MLD Join to the home network 5 (S162), and starts receiving data addressed to the specified multicast address (S164). The HeNB 80 transmits a session management request to the UE 90 (S166). The session management request to be transmitted includes the UL TFT and the EPS bearer ID. The session management request to be transmitted herein includes "FF02::C" as the UL TFT of the multicast group to be joined and the "bearer 2" as a bearer for the Local IP Access.

In accordance with UL TFT and the EPS bearer ID included in the session management request, the UE 90 updates the EPS bearer context 934 as illustrated in FIG. 12(C) (S168), and then transmits a session management response to the HeNB 80 (S170).

The HeNB 80 receives the session management response, and the multicast session establishment procedure for the Local IP Access is thus complete. Through the transmission and reception of the session management request and the session management response, the HeNB 80 updates the EPS bearer context 834 as illustrated in FIG. 9(C).

Furthermore, the HeNB 80 adds the UE 90, the multicast address and the bearer ID to the multicast group join list 832. In this way, if another UE different from the UE 90 transmits a multicast request, the HeNB 80 references the multicast group join list 832 to determine whether a multicast address included in the join request is the multicast address already received from the UE 90. If the multicast address is the one already received from the UE 90, the multicast session establishment procedure is thus performed by bypassing the transmission of the multicast join request message (S162) and the multicast reception start (S164) of the HeNB 80.

Figure 17:
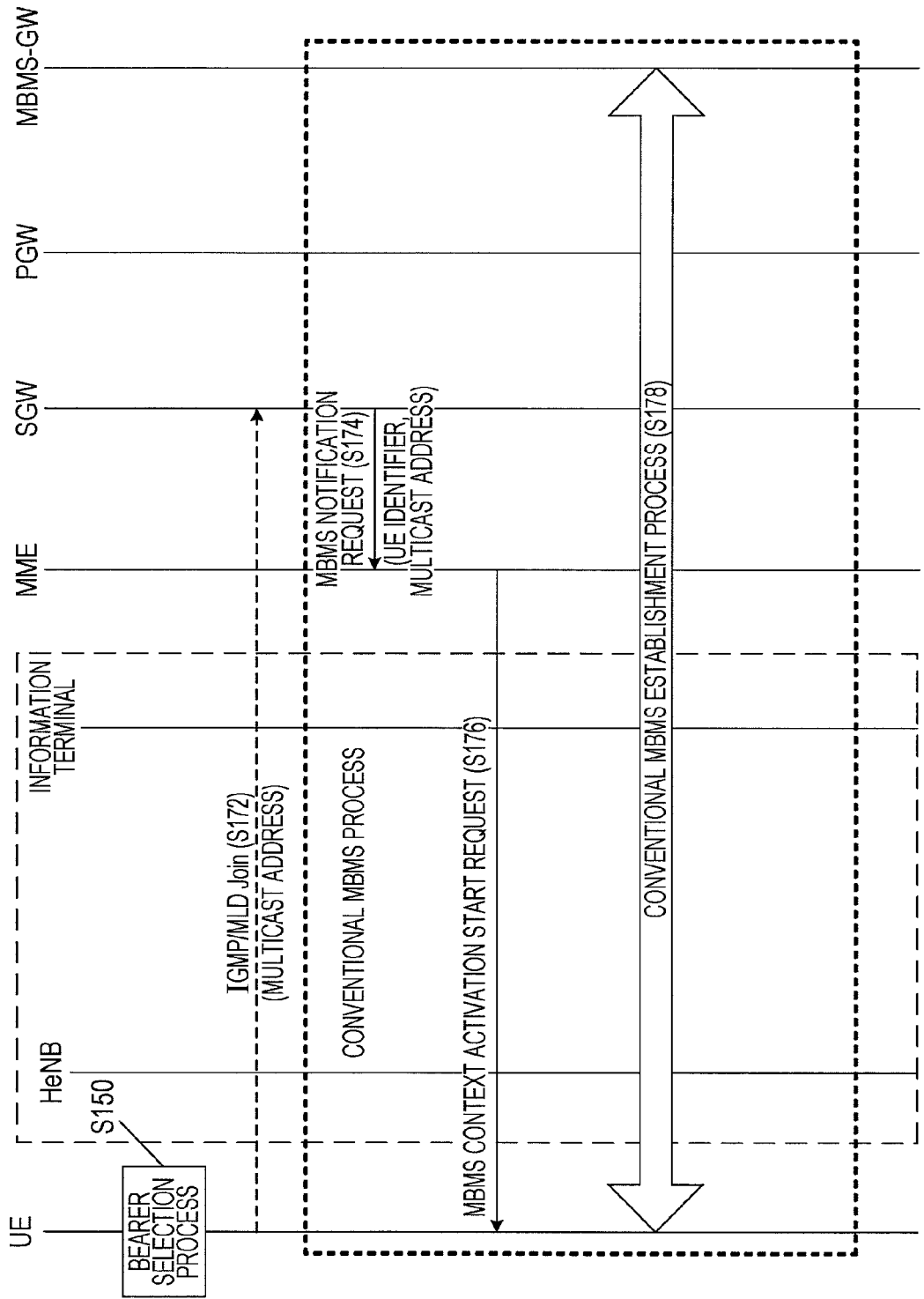
FIG. 17 illustrates an example of an MBMS multicast session establishment process sequence in the first embodiment.

If the UE 90 determines in the bearer selection process (S150) that the multicast data reception is requested using the conventional MBMS, and the bearer not for the Local IP Access (bearer 1) is selected, the HeNB 80 transmits the multicast join request message to the SGW 30 via the bearer 1 (S172) as illustrated in FIG. 17, and thus performs a communication establishment procedure of the MBMS service.

More specifically, the SGW 30 transmits to the MME 10 a MBMS notification request including an UE ID and a multicast address (S174), and the MME 10 transmits to the UE 90 an MBMS context activation start request (S176). An MBMS session establishment process is thus performed among the UE 90, the HeNB 80, the MME 10, the SGW 30, and the MBMS-GW 50 (S178).

Figure 18:
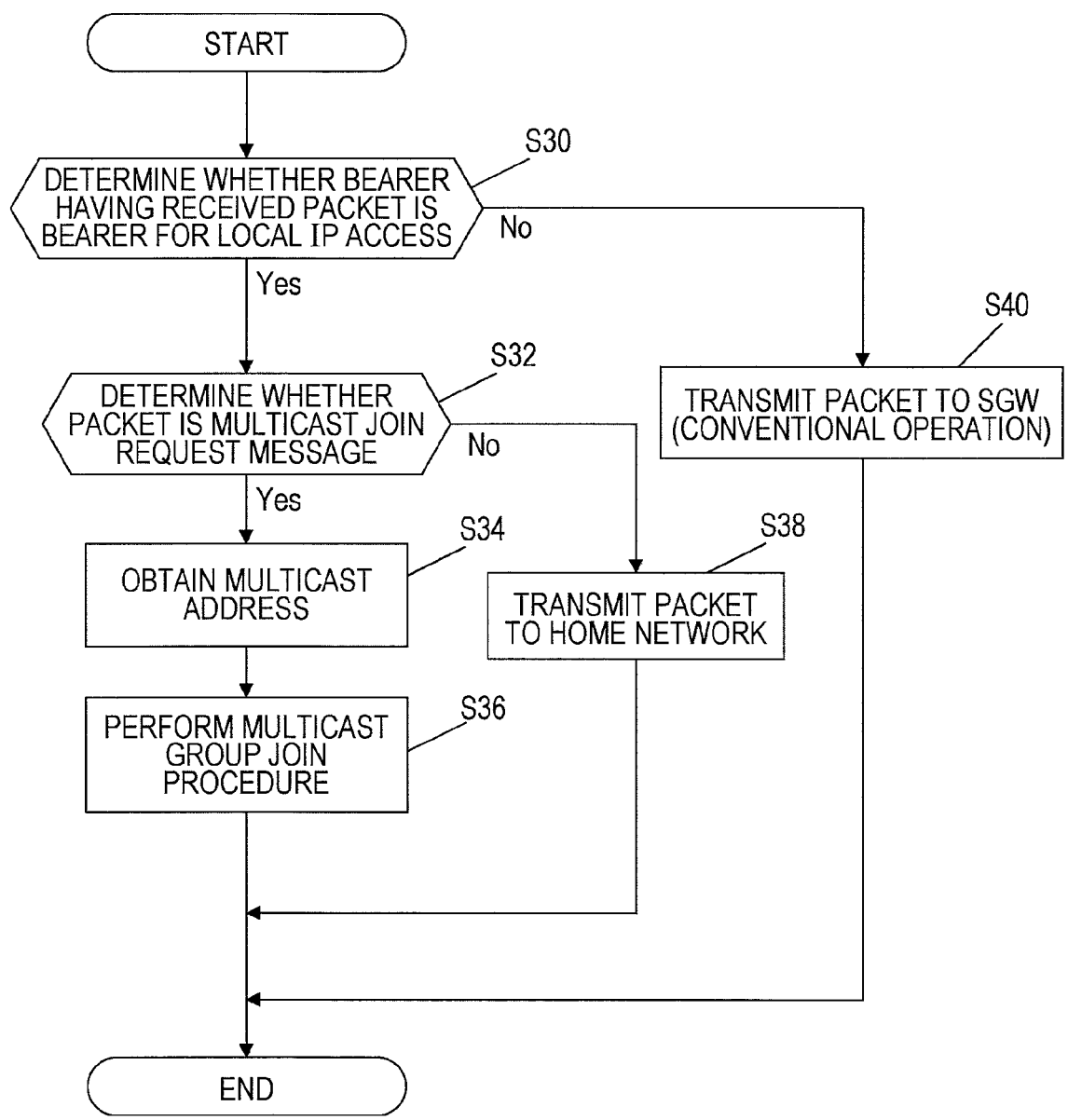
FIG. 18 is a flowchart illustrating a process of a home base station apparatus in the first embodiment.

The reception process of the HeNB 80 for a packet transmitted from the UE 90 in the above discussion is described with reference to FIG. 18. The HeNB 80 determines whether the received packet has been transmitted via the bearer for the Local IP Access (bearer ID 2) or via the other bearer (bearer ID 1) (step S30).

If the packet has been transmitted via the bearer for the Local IP Access (bearer ID 2) (yes from step S30), the HeNB 80 determines whether the transmitted packet is a multicast join request message (S32).

The determination as to whether the transmitted packet is a multicast join request message is made by referencing a protocol number and a payload of the packet. For example, IGMP Join indicates that the protocol number written in an IP header of the transmitted packet is "2," and the HeNB 80 determines that the packet is an IGMP protocol message. Since a type field of a subsequent payload portion is "0x22," the HeNB 80 determines that the packet is a multicast join request of IGMPv3.

Also, MLD Join indicates that a protocol number written in an IP header of the transmitted packet is "58," the HeNB 80 determines that the packet is an ICMP protocol message. Since a type field of a subsequent payload portion is "143", the HeNB 80 determines that the packet is a multicast join request of MLDv2.

If it is determined that the packet is a multicast join request packet (yes from step S32), the HeNB 80 obtains a multicast address (step S34). The multicast address is obtained by extracting the multicast address from the payload portion subsequent to the IP header of the packet of the multicast join request message.

The HeNB 80 then performs a join procedure to the multicast group of the obtained multicast address (step S36).

More specifically, as described with reference to FIG. 15, the HeNB 80 transmits the IGMP Join or the MLD Join to within the home network 5 in order to join the group of the specified multicast address (step S162), and starts receiving data addressed to the specified multicast address (step S164). The HeNB 80 then transmits the session management request to the UE 90 (step S166). The session management request includes the UL TFT and the EPS bearer ID.

The session management request to be transmitted includes "FF02::C" as the UL TFT of the multicast group to be joined, and the bearer 2 as a bearer for the Local IP Access. The HeNB 80 then performs the multicast data transmission and reception process, and the UE 90 thus establishes multicast communications.

If it is determined that the packet transmitted by the UE 90 is not a multicast join request (no from step S32), the HeNB 80 performs a NAT process, thereby transmitting the packet to the home network 5 (step S38)

If it is determined in step S30 that the UE 90 has transmitted via the bearer not for the Local IP Access (bearer ID 1) (no from S30), the HeNB 80 transmits the packet to the SGW 30 in the same conventional manner (step S40).

To transmit a join request to the multicast group of the MBMS service, the UE 90 transmits the join request via a bearer not for the Local IP Access (bearer ID 1). In such a case, the HeNB 80 transmits the packet to the SGW 30 in accordance with the above-described process. As described with reference to FIG. 17, the SGW 30 and the MME 10 receive the multicast join request of the MBMS service, and the multicast communication establishment procedure is performed.

1.3.4 Multicast Data Reception Process

When a Local IP Access multicast session has been established, the UE 90 can receive multicast data transmitted from within the home network 5.

Figure 19:
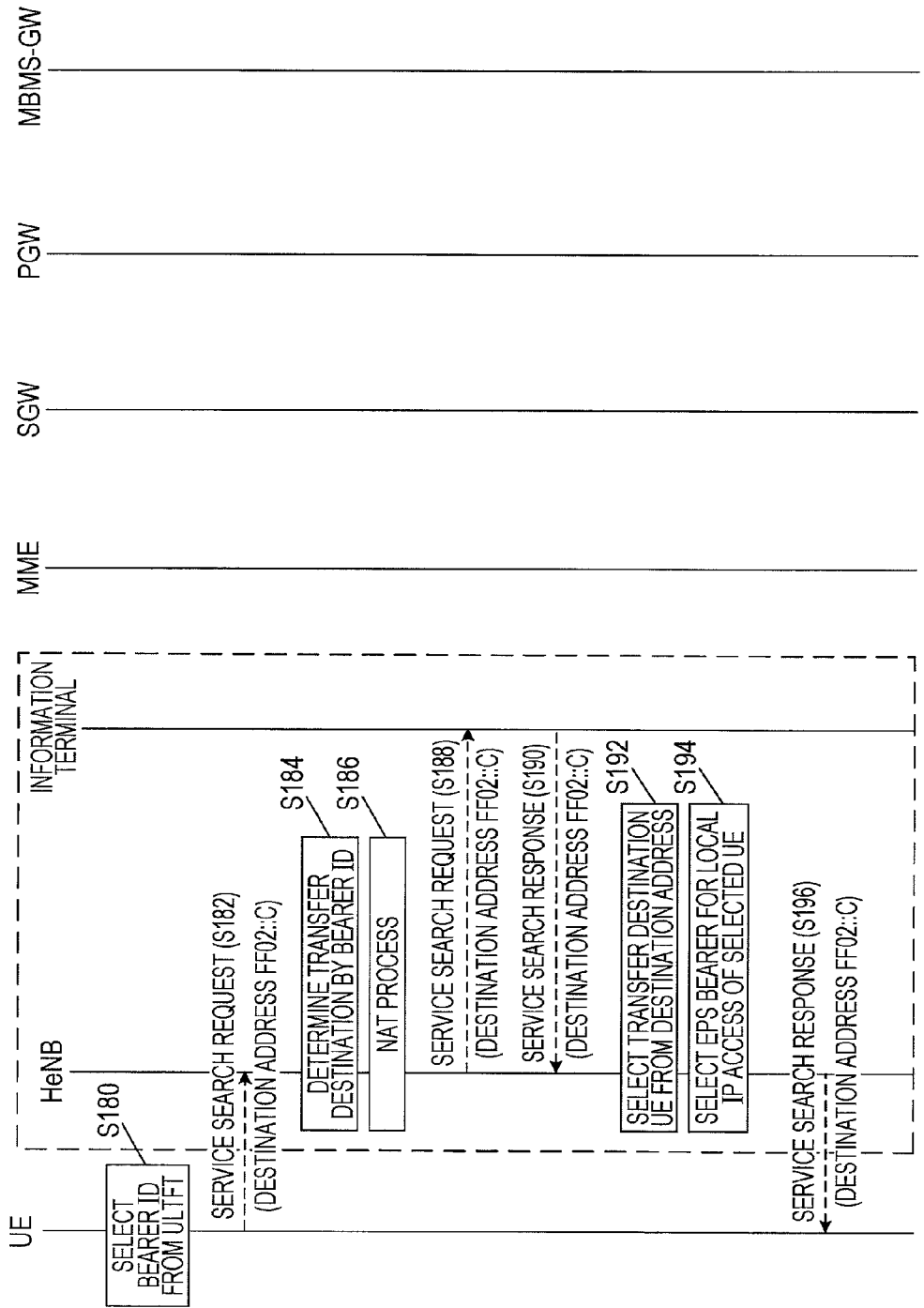
FIG. 19 illustrates an example of a multicast data transmission and reception process of the UE in the first embodiment.

Described with reference to FIG. 19 is a multicast data reception process that is performed when the UE 90 transmits and receives a service search request in accordance with a service discovery protocol such as UPnP.

The UE 90 transmits a service search request first. Since a transmission destination address of the service search request is "FF02::C," the UE 90 selects a bearer (EPS bearer 2) in accordance with the UL TFT of the EPS bearer context (S180), and then transmits the search request via the EPS bearer 2 (S182).

The HeNB 80 determines a transfer destination in accordance with the bearer ID (S184). Since the service search request is received via the EPS bearer 2, the HeNB 80 determines that the service search request be directly transferred to the home network in accordance with the EPS bearer context 834, performs the NAT process (step S186), and then multicast-transmits the service search request over the home network 5 (S188).

The information terminal 70 receives the service search request, and multicast-transmits a service search response including information of a provided service (such as a "print service") to "FF02::C" (S190).

The HeNB 80 receives the service search response, references the multicast group join list 832, selects a UE as a transfer destination joining the multicast group (S192), selects an EPS bearer for the Local IP Access of each UE (S194), and transmits a service search response to the UE 90 via the selected EPS bearer (S196).

When the HeNB 80 references the multicast group join list 832, no UE 90 joining the multicast group may be found. In such a case, received multicast data (the service search response herein) is discarded.

If the UE 90 itself provides service, the UE 90 receives via the HeNB 80 a service search request transmitted from the information terminal 70, and transmits a service search response to the HeNB 80 via the EPS bearer 2. The HeNB 80 transfers the service search response over the home network 5.

In accordance with the present embodiment, only the information terminal 70 is present over the home network 5. The present invention is not limited to such a case. The same operation may be performed if a plurality of information terminals are present. More specifically, the HeNB 80 multicast-transmits the service search request to "FF02::C" in S188. Even if a plurality of information terminals are present over the home network 5, all the information terminals can receive the service search request.

In this way, in accordance with the present embodiment, when the UE 90 connected to the HeNB 80 having the Local IP Access function transmits the multicast group join request, the HeNB 80, rather than transmitting the multicast group join request to the SGW 30 as in the conventional manner, determines whether the multicast join request is to request multicast data reception at the Local IP Access or multicast data reception based on the conventional MBMS, and then selects an appropriate multicast session establishment procedure in response to determination results.

The UE 90 can thus receive the multicast data even in a Local IP Access environment onto which MBMS is not retrofitted, while keeping compatibility with an existing system. For example, the UE 90 can operate in accordance with the multicast-based service discovery protocol, such as UPnP, without the need for modification.

In response to a multicast join request, the UE 90 determines whether to join the multicast group via the Local IP Access of the home network 5 or the multicast group of the MBMS service of the core network 3, and then performs the bearer selection process. This arrangement frees the HeNB 80 from the workload involved in this determination process and the bearer selection process.

Also in the present embodiment, no apparatus in the core network 3 needs to perform the determination process as to whether to join the multicast group via the Local IP Access of the home network 5 or the multicast group of the MBMS service of the core network 3. More specifically, the present embodiment is implemented without modifying the process of each of the SGW 30 and the MME 10.

2. Second Embodiment

In succession, a second embodiment of the present invention is described below. The present embodiment is identical to the first embodiment in the network configuration and the apparatus configuration except the configuration of the HeNB, and the detailed description of the elements other than the HeNB is omitted herein.

2.1 Apparatus Configuration

Each apparatus is briefly described with reference to the drawings. As described above, in the second embodiment, the HeNB 80 is replaced with an HeNB 82.

Figures 20, 21:
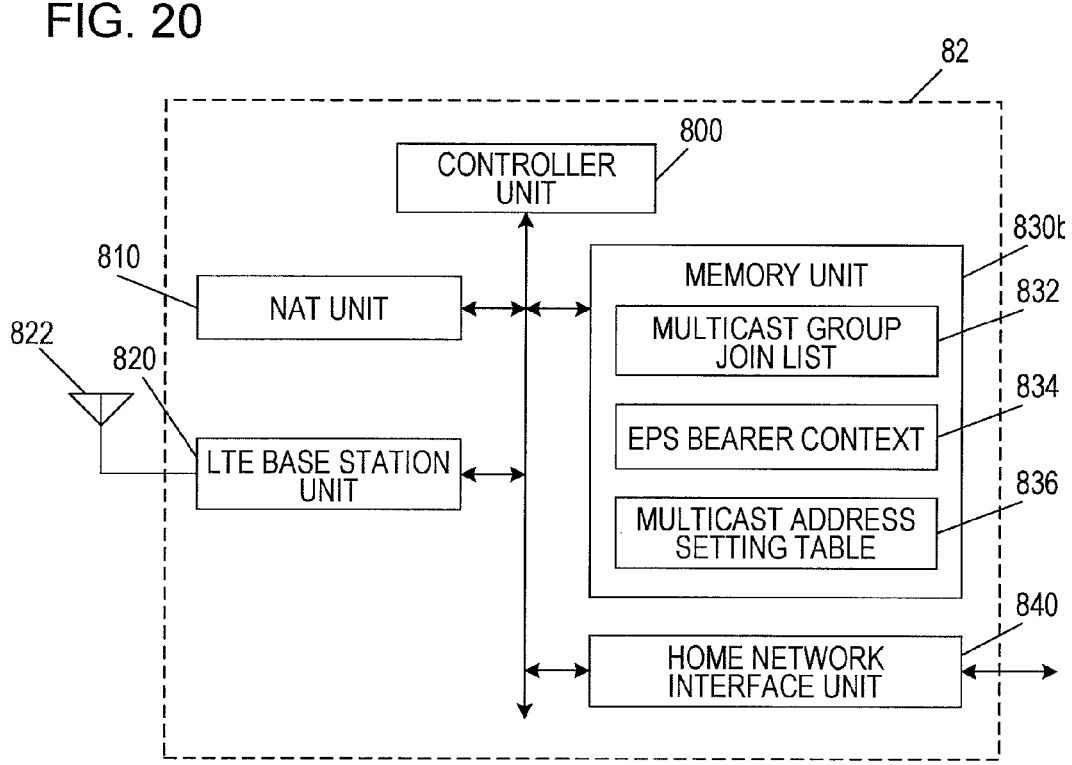
FIG. 20 is a configuration diagram of an HeNB in a second embodiment.
FIG. 21 illustrates an example of a multicast address setting table of the HeNB in the second embodiment.

FIG. 20 illustrates the configuration of the HeNB 82 in the present embodiment. In the HeNB 82 of FIG. 20, elements identical to those of the HeNB 80 of FIG. 7 are designated with the same reference numerals and the discussion thereof are omitted herein.

In the HeNB 80, a controller unit 800 is connected to NAT (Network Address Translation) unit 810, LTE base station unit 820, memory unit 830b, and home network interface unit 840 via a bus.

The memory unit 830b is a function unit that stores a program and data needed in a variety of operations of the HeNB 82. The memory unit 830b further stores multicast group join list 832, EPS bearer context 834, and multicast address setting table 836.

FIG. 21 illustrates an example of the multicast address setting table 836. The multicast address setting table 836 is a database that stores an IP address of a multicast group joined via the Local IP Access.

2.2 Description of Process

The second embodiment is different from the first embodiment in the multicast session establishment procedure described with reference to FIG. 15. Referring to FIG. 20, a multicast session establishment procedure of the second embodiment is described in comparison with the first embodiment of FIG. 15.

Figure 15:
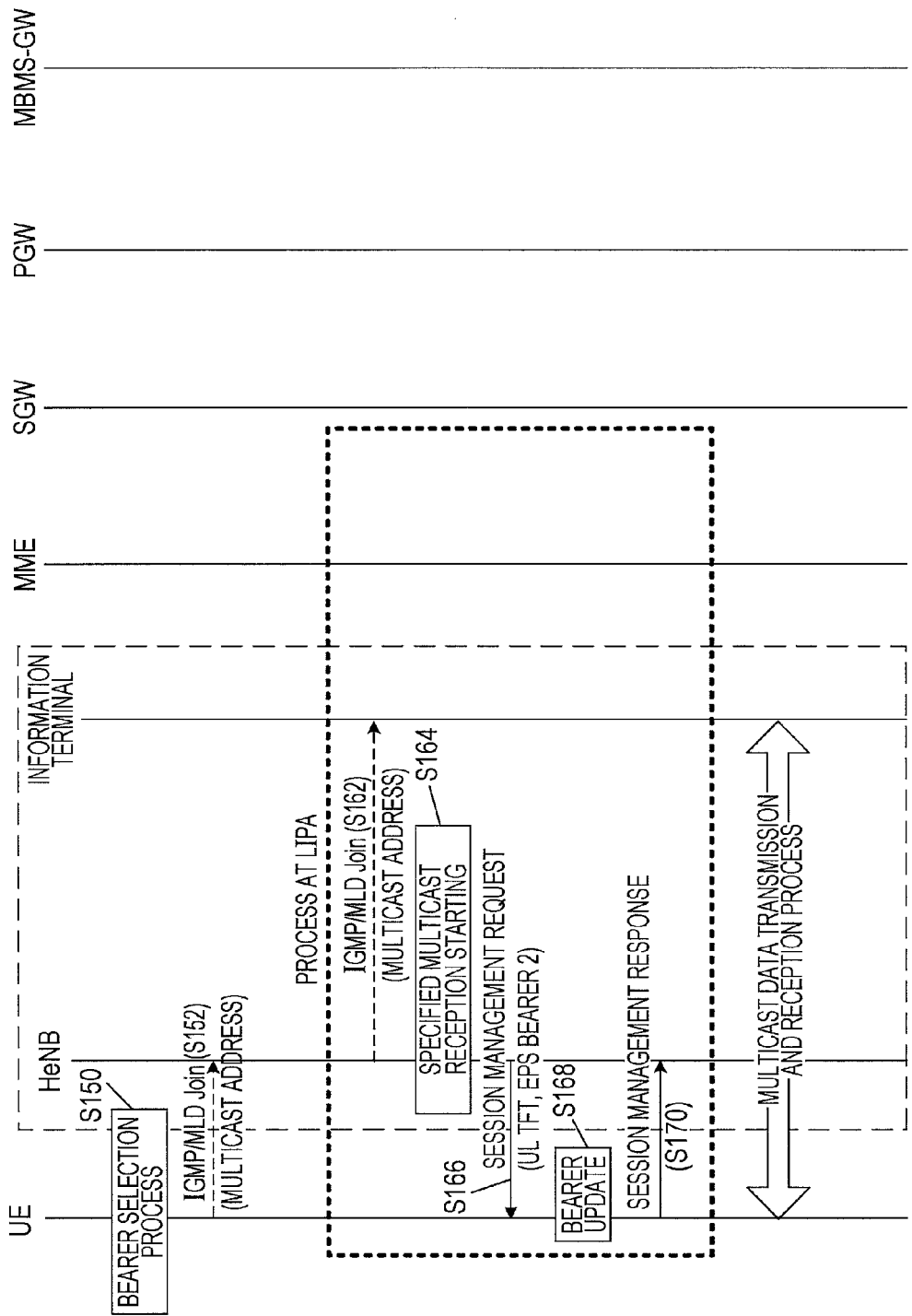
FIG. 15 illustrates an example of a multicast session establishment process sequence for the Local IP Access in the first embodiment.

In the first embodiment of FIG. 15, the HeNB 80 performs the multicast address acquisition process and the multicast reception request process after the UE 90 transmits the multicast join request. The HeNB 80 thus determines whether the packet is a join request to the multicast group for the Local IP Access of the home network.

If the packet is a join request to the multicast group for the Local IP Access of the home network, the HeNB 80 transmits the multicast join request to the home network (S162), and starts receiving the multicast data specified after joining the multicast group (S164).

The HeNB 80 and the UE 90 then transmit and receive the session management request and the session management response, and update the bearer context (S166, S168, and S170). Finally, the multicast data is transmitted and received.

On the other hand, the second embodiment is different from the first embodiment in that the HeNB 82 joined beforehand the multicast group before the UE 90 transmits the multicast join request. The procedure is described with reference to FIG. 22.

Before the UE 90 transmits a multicast join request, the HeNB 82 transmits a multicast join request to the home network 5 (S200), and starts receiving specified multicast (S202). In this way, the HeNB 82 joins beforehand the multicast group set in the multicast address setting table 836.

The multicast address setting table 836 is statically configured by a user who supervises the home network 5. Alternatively, a multicast address for use in the home network 5 is assigned to the entire communication system, and is then statically configured at the shipment of the UE 90.

The HeNB 82 transmits a session management request to the UE 90 (S204). The session management request to be transmitted includes a bearer ID and a UL TFT. A multicast address from the multicast address setting table 836 set for the Local IP Access of the multicast group in the home network 5 is written in the UL TFT. The session management request including "FF02::C" as the UL TFT of the multicast group to be joined and the bearer 2 as a bearer for the Local IP Access is transmitted.

In accordance with the UL TFT and the EPS bearer ID, included in the session management request, the UE 90 updates the EPS bearer context 934 as illustrated in FIG. 12(C) (S206), and transmits a session management response to the HeNB 82 (S208).

Furthermore, the UE 90 adds "FF02::C" from the UL TFT to the multicast address setting table 932. In the first embodiment, it is necessary for the UE 90 to hold the multicast address in advance in the multicast address setting table 932. In the second embodiment, however, the multicast address is dynamically set and does not need to be stored in advance.

In accordance with the present embodiment, using the session management request, the HeNB 82 notifies the UE 90 of the multicast address (S204), which the UE 90 stores in the multicast address setting table 932. Alternatively, the HeNB 82 may notify the UE 90 of the multicast address using a message other than the session management request (S204).

In accordance with the present embodiment, the HeNB 82 transmits the join request message for the multicast group (S200), and notifies the UE 90 of the multicast address after starting the reception of the specified multicast (S202). Alternatively, the HeNB 82 may notify the UE 90 of the multicast address before transmitting the join request message for the multicast group. For example, the multicast address may be transmitted in the session management request (S122) in the bearer establishment procedure of the first embodiment described with reference to FIG. 14.

The UE 90 then performs a bearer selection process (S212), and transmits a multicast join request message (S214), thereby performing a multicast data transmission and reception process. The bearer selection process (S212), the multicast join request message transmission process (S214), and the multicast data transmission and reception process are identical to counterparts in the first embodiment, and the detailed discussion thereof is omitted herein.

Unlike in the first embodiment, the HeNB 82 pre-stores the multicast address setting table 836, and notifies the UE 90 of the multicast address of the multicast group provided at the Local IF Access in the second embodiment. In this way, the UE 90 does not need to store the multicast address in the multicast address setting table 932 in advance. The multicast address can be dynamically set.

In the second embodiment, the HeNB 82 pre-joins the multicast group. In comparison with the first embodiment, the HeNB 82 does not need to join the multicast group and to receive the multicast address in response to the multicast join request of the UE 90. For this reason, time and process from the transmission of the multicast join request from the UE 90 to the transmission and reception of the multicast data are shortened. The transmission and reception of the multicast data are started at high speed.

Even if the HeNB 82 has not joined the multicast group, however, the HeNB 82 may transmit the multicast join request (S200) in concert with the reception of the multicast join request transmitted from the UE 90 (S212) in order to establish multicast communications.

3. Modifications

The embodiments of the present invention have been discussed in detail with reference to the drawings. Specific structures of the present invention are not limited to the embodiments. Designs and other features, which do not depart from the characteristics of the present invention, fall within the scope of the present invention defined by the claims.

In each of the embodiments, communications are performed in accordance with IPv6. The present invention is equally applicable to communications in IPv4 by using the multicast join request based on the multicast address of IPv4.

In the first and second embodiments, the HeNB 80 joins the multicast group and transmits a multicast packet to the UE 90 in response to a multicast join request of the UE 90. Therefore, the HeNB 80(82) needs to perform a control procedure for multicast joining and a reception procedure for a multicast packet.

FIG. 23 illustrates a modification of the embodiments. As described with reference to the first and second embodiments, the UE 90 performs the bearer selection process (S150), and transmits the multicast address using the bearer for the Local IP Access (bearer. ID 2) (S152). Upon receiving the multicast address, the HeNB 80(82) performs the NAT process and transmits the multicast address to the home network in the same manner as when the conventional data has been received. The HeNB 80(82) is thus free from the need to perform any process for the multicast join procedure. The UE 90 can join the multicast group (S300). The UE 90 performs multicast communications by transmitting and receiving multicast data (S302).

In the first and second embodiments, when the HeNB 80(82) joins the multicast group, a plurality of UEs 90 for multicast communications may be connected to the HeNB 80(82). In such a case, the HeNB 80(82) having received the multicast packet makes copies and then transmits the copies to the UEs 90 respectively. In the above example, however, the multicast packet is transmitted to each UE via the HeNB 80(82).

Although the process of FIG. 23 results in more data transmission traffic than in the first and second embodiments, the process of the HeNB 80(82) is simplified.

A program running on each apparatus in each of the embodiments is a program that controls a CPU or the like (a program causing a computer to function) so that the function of the embodiments is performed. In formation handled by each apparatus is temporarily stored on a temporary memory unit (such as RAM) during processing, and then stored on one of a storage devices including a variety of ROMs and HDD. The information may be read, corrected, and written by the CPU as necessary.

Recording media storing the program include a semiconductor medium (such as a ROM, or a non-volatile memory unit card), optical recording medium, magneto-optical recording medium (such as DVD (Digital Versatile Disc), MO (Magneto-optical Disc), MD (Mini Disc), CD (Compact Disc), BD, etc.), magnetic recording medium (such as magnetic tape, flexible disc), and the like. When the loaded program is executed, not only the functions of the embodiments are implemented, but also the functions of the present invention may be implemented by performing the processes in response to an instruction of the program in conjunction with an operating system, other application programs, and the like.

To distribute the program in the market, a portable recording medium having the program stored thereon is distributed. The program may also transferred to a server computer via a network such as the Internet connected to the server computer. In such a case, the storage device of the server computer falls within the scope of the present invention.

Part or whole of each apparatus of the embodiments may be implemented typically using LSI (Large Scale Integration) as an integrated circuit. The function block of each apparatus may be integrated into an individual chip. Part or whole of the functions may be integrated into a chip. The circuit integration technique is not limited to LSI. The circuit integration technique may be applicable to a dedicated circuit or a general-purpose processor. If a technique of circuit integration replacing the LSI appears with the advance of semiconductor technique, an integrated circuit resulting from the technique may also be used.

REFERENCE SIGNS LIST

1 Mobile communication system
3 Core network
10 MME
100 Controller unit
110 Transceiver unit
130 Memory unit
132 Subscription DB
134 EPS bearer context
20 GW
30 SGW
300 Controller unit
310 First transceiver unit
320 Second transceiver unit
330 Memory unit
332 EPS bearer context
40 PGW
50 MBMS-GW
5 Home network
60 Home GW
70 Information terminal
700 Controller unit
710 Home network interface unit
730 Memory unit
80 and 82 HeNBs
800 Controller unit
810 NAT unit
820 LTE base station unit
822 External antenna
830 and 830b Memory units
832 Multicast group join list
834 EPS bearer context
836 Multicast address setting table
840 Home network interface unit
90 UE
900 Controller unit
910 LTE interface unit
912 External antenna
930 Memory unit
932 Multicast address setting table
934 EPS bearer context
7 Broadband access network

The invention claimed is:

1. A method for a home base station apparatus in a mobile communication system including a home network and a core network connected to each other via an external network, the home network being able to connect the home base station apparatus that is to be connected to a mobile station apparatus, and an apparatus that is IP communicable, the method comprising:
receiving, a multicast join request containing a multicast address of a multicast group being provided in the home network, from the mobile station apparatus;
performing a join procedure to the multicast group of the multicast address;
transferring multicast data transmitted from the home network, to the mobile station apparatus;
receiving the multicast join request via a first bearer through which the mobile station apparatus communicates with the home network or a second bearer through which the mobile station apparatus communicates with the core network, and
performing the join procedure to the multicast group in a case that the multicast join request is received via the first bearer.

2. The method according to claim 1, further comprising:
transmitting, to the core network, the multicast join request in a case that the multicast join request is received via the second bearer.

3. A mobile station apparatus which is configured to be able to connect to a home base station apparatus in a mobile communication system including a home network and a core network connected to each other via an external network, the home network being able to connect the home base station apparatus and an apparatus that is IP communicable, the mobile station apparatus comprising:
multicast address storage circuit configured to store a multicast address of a multicast group being provided in the home network, wherein
the mobile station apparatus is configured to be able to establish a first bearer through which the mobile station apparatus communicates with the home network and a second bearer through which the mobile station apparatus communicates with the core network, and
in the transmission of the multicast join request, the mobile station apparatus is configured to transmit the multicast join request by selecting the first bearer in case that the multicast address contained in the multicast join request is stored on the multicast address storage circuit, and
the multicast join request addressed to the core network is transmitted by selecting the second bearer.

4. A method for a home base station apparatus in a mobile communication system including a home network and a core network connected to each other via an external network, the home network being able to connect the home base station apparatus that is to be connected to a mobile station apparatus and an apparatus that is IP communicable, the method comprising:
storing a multicast address of a multicast group being provided in the home network;
establishing, with between the mobile station apparatus, a first bearer through which the mobile station apparatus communicates with the home network;
receiving multicast data corresponding to the multicast address from the home network;
transmitting the multicast data to the mobile station apparatus via the first bearer;
establishing a second bearer through which the mobile station apparatus communicates with the core network;
receiving data to be transmitted to the mobile station apparatus from the core network; and
transmitting the data to the mobile station apparatus via the second bearer.

5. A home base station apparatus in a mobile communication system including a home network and a core network connected to each other via an external network, the home network being able to connect the home base station apparatus that is to be connected to a mobile station apparatus, and an apparatus that is IP communicable, the home base station apparatus comprising:
a reception unit configured to receive, a multicast join request containing a multicast address of a multicast group being provided in the home network, from the mobile station apparatus; and a circuit configured to:
perform a join procedure to the multicast group of the multicast address, and
transfer multicast data transmitted from the home network, to the mobile station apparatus;
the reception unit configured to receive the multicast join request via a first bearer through which the mobile station apparatus communicates with the home network or a second bearer through which the mobile station apparatus communicates with the core network, and
the circuit configured to perform the join procedure to the multicast group in a case that the multicast join request is received via the first bearer.

6. The home base station apparatus according to claim 5, further comprising:
a transmitting unit configured to transmit, to the core network, the multicast join request in a case that the multicast join request is received via the second bearer.

7. A home base station apparatus in a mobile communication system including a home network and a core network connected to each other via an external network, the home network being able to connect the home base station apparatus that is to be connected to a mobile station apparatus and an apparatus that is IP communicable, the home base station apparatus comprising:

a memory unit configured to store a multicast address of a multicast group being provided in the home network;
a circuit configured to establish, with between the mobile station apparatus, a first bearer through which the mobile station apparatus communicates with the home network;
a reception unit configured to receive multicast data corresponding to the multicast address from the home network;
a transmitting unit configured to transmit the multicast data to the mobile station apparatus via the first bearer; and
the reception unit configured to receive a multicast join request addressed from the core network via the second bearer.

8. The home base station apparatus according to claim 7, wherein
the circuit is configured to establish a second bearer through which the mobile station apparatus communicates with the core network,
the reception unit is configured to receive data to be transmitted to the mobile station apparatus from the core network, and
the transmitting unit is configured to the data to the mobile station apparatus via the second bearer.

* * * * *